(12) United States Patent
Gustavsson

(10) Patent No.: US 7,668,320 B2
(45) Date of Patent: Feb. 23, 2010

(54) SOUND REPRODUCTION IN PORTABLE ELECTRONIC EQUIPMENT

(75) Inventor: Stefan Gustavsson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 207 days.

(21) Appl. No.: 10/587,488

(22) PCT Filed: Jan. 21, 2005

(86) PCT No.: PCT/EP2005/000570

§ 371 (c)(1),
(2), (4) Date: Jul. 27, 2006

(87) PCT Pub. No.: WO2005/076581

PCT Pub. Date: Aug. 18, 2005

(65) Prior Publication Data

US 2007/0127740 A1 Jun. 7, 2007

(30) Foreign Application Priority Data

Jan. 29, 2004 (EP) .................................. 04001929

(51) Int. Cl.
H04R 3/00 (2006.01)
(52) U.S. Cl. .................... 381/111; 381/116; 381/335; 455/149; 455/350; 455/569.1; 379/433.01; 379/433.02

(58) Field of Classification Search ................. 381/111, 381/116–117, 58–59, 334–335; 455/149, 455/350, 569.1; 379/433.02
See application file for complete search history.

(56) References Cited

U.S. PATENT DOCUMENTS

| 4,124,786 | A | * | 11/1978 | Kircher ........................ 381/59 |
| 4,683,591 | A | * | 7/1987 | Dawson et al. ................. 381/85 |
| 6,324,284 | B1 | | 11/2001 | Hawker et al. |
| 6,819,939 | B2 | * | 11/2004 | Masamura ................ 455/550.1 |
| 6,999,585 | B2 | * | 2/2006 | Nakamura ............. 379/433.01 |
| 7,139,402 | B2 | * | 11/2006 | Abe et al. ....................... 381/97 |
| 7,194,099 | B2 | * | 3/2007 | Lewis ......................... 381/182 |
| 7,263,196 | B2 | * | 8/2007 | Aubauer et al. ............. 381/332 |
| 2003/0068987 | A1 | | 4/2003 | Dufosse et al. |
| 2006/0262945 | A1 | * | 11/2006 | Lechner ...................... 381/111 |

FOREIGN PATENT DOCUMENTS

EP   1 091 539 A2   4/2001
JP   11-88483 A   3/1999

* cited by examiner

Primary Examiner—Vivian Chin
Assistant Examiner—Disler Paul
(74) Attorney, Agent, or Firm—Harrity & Harrity, LLP

(57) ABSTRACT

The present invention is directed towards a portable electronic equipment (10) comprising a speaker (16) and a receiver (18), wherein the receiver (18) is damped while the speaker (16) is active to provide good sound reproduction.

18 Claims, 2 Drawing Sheets

SOUND REPRODUCTION IN PORTABLE ELECTRONIC EQUIPMENT

TECHNICAL FIELD OF THE INVENTION

The present invention relates to the field of portable electronic equipment, in particular to high quality sound reproduction in such a device.

DESCRIPTION OF RELATED ART

A conventional portable electronic equipment such as a cellular phone typically comprises elements such as a housing, a display, operation buttons, a speaker, and a receiver for outputting received sound and a microphone for converting voice from a user to a sound signal to be transmitted. The volume available, for instance, put restrictions on the back volume available for the speaker and the receiver. Therefore they may have to share the same back volume.

Herein, the term "receiver" is referred to as an element that transduces electric signals into sound. Herein, a "speaker" is referred to an element typically employed to provide a ringer signal.

However, if the receiver and the speaker share the same back volume there will be a number of problems. One problem is that the receiver will act as a leak when the loudspeaker is active, with loss in the low frequencies as a result, resulting in lower quality sound reproduction.

Yet another problem is that there is a risk for loud ringer levels in the receiver outlet.

Thus, there is a need for a portable electronic equipment which provides high quality sound reproduction having speaker and receiver sharing the same back volume.

SUMMARY OF THE INVENTION

Aspects of the present invention are therefore directed towards providing high quality sound reproduction in a portable electronic equipment having a speaker and a receiver sharing the same back volume.

One aspect of the present invention is thus directed towards providing a portable electronic equipment with simulated closed box behavior with shared back volume.

Herein the term "simulated closed box behavior" is referred to as an ideal behavior without leaking problems.

According to a first aspect of the present invention, a portable electronic equipment is provided comprising:

a speaker for sound reproduction, and a receiver for sound reproduction, which speaker and receiver share a back volume, characterised in that said portable electronic equipment comprises a control/damping unit arranged to damp the receiver while the speaker is active.

A second aspect of the present invention includes the features of the first aspect, wherein said control/damping unit comprises a control unit that controls switching between receiver mode and speaker mode.

A third aspect of the present invention includes the features of the second aspect, wherein said control unit is arranged to control voltage or current over the receiver such that it avoid the latter to operate as a leak.

A fourth aspect of the present invention includes the aspect of any one of the previous aspects, wherein the equipment is a cellular phone, a smart phone or a communicator.

A fifth aspect of the present invention is directed towards a method for sound reproduction in a portable electronic equipment comprising a speaker and a receiver for sound reproduction, comprising the steps of:

providing sound reproduction by means of a speaker and a receiver sharing a back volume, damping the receiver while the speaker is active.

A sixth aspect of the present invention includes the features of the fifth aspect, wherein voltage or current over the receiver is controlled such that it avoids the latter to operate as a leak.

A seventh aspect of the present invention includes the features of the fifth or the sixth aspect, wherein switching between speaker mode and sound receiver mode is controlled to provide damping the receiver while the speaker is active.

The present invention has many advantages, one being that it prevents loss in the low frequency response of the speaker. Another advantage of the present invention is that loud ringer levels in the receiver outlet are avoided.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
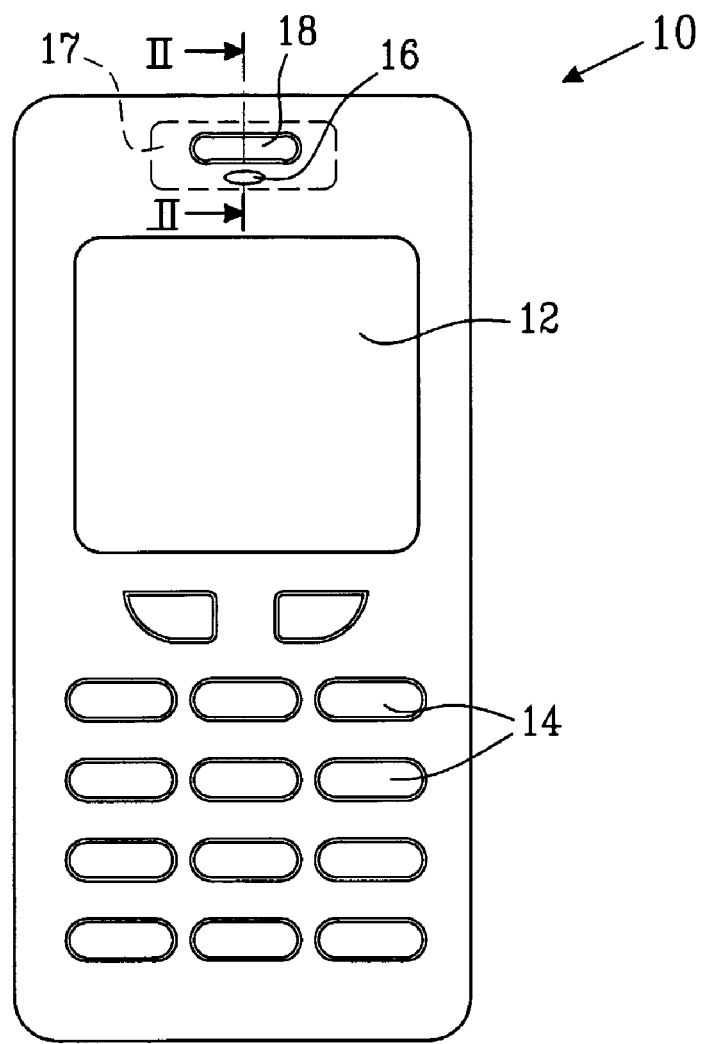
FIG. 1 is a schematic front view (not to scale) illustrating a portable electronic equipment according to a first embodiment of the present invention.

Referring now to the drawings, a description will be given in detail of embodiments in accordance with the present invention.

Figure 2:
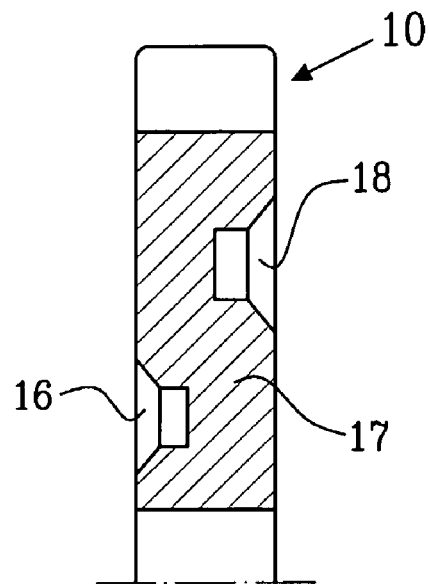
FIG. 2 is side view of the portable electronic equipment illustrated in FIG. 1.
Figure 3:
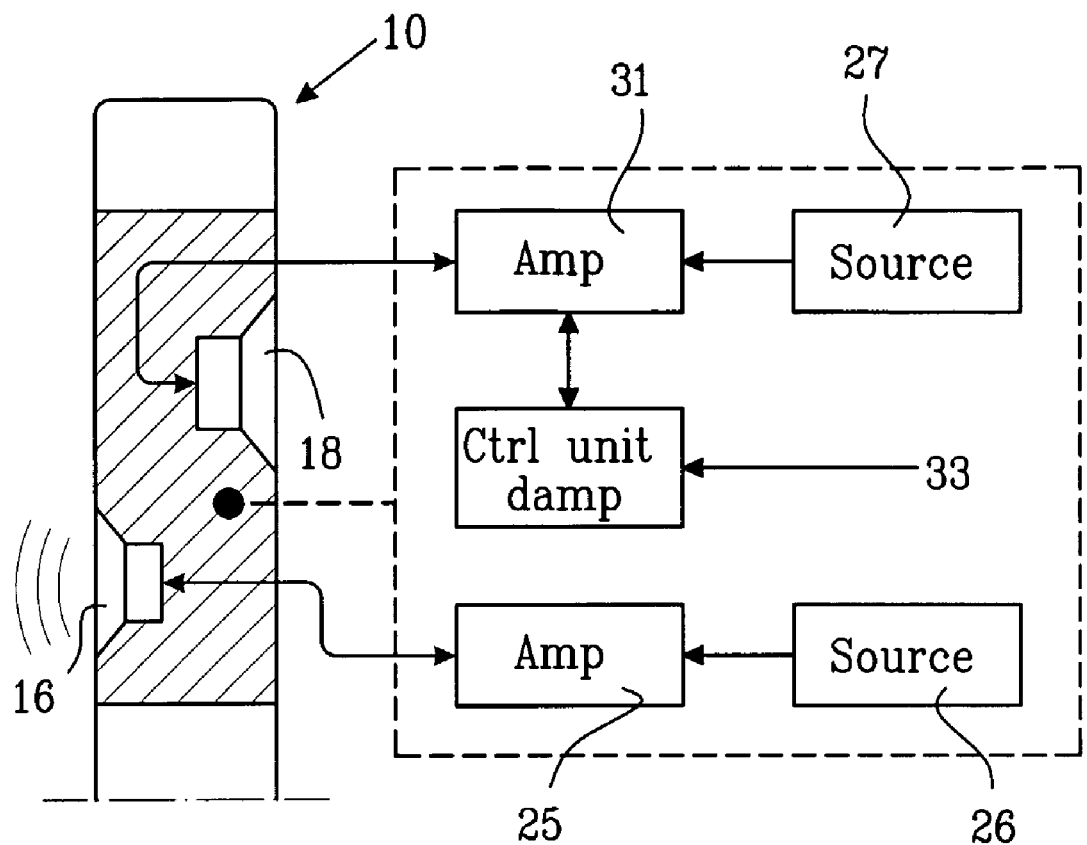
FIG. 3 is a side view and a block diagram showing the brief internal composition of the first embodiment of the invention.

A portable electronic equipment 10 according to an embodiment of the invention is shown in FIGS. 1, 2 and 3. In a first preferred embodiment, the portable electronic equipment 10 is a cellular phone having an antenna (not shown), a display 12 and operating buttons 14. As shown in FIG. 2, a first signal-vibration transducer for implementing a speaker 16 provided with a back-volume 17 is located to the left of the cellular phone, and a second signal-vibration transducer for implementing a receiver 18 is located to the right nearby the first one sharing the same back-volume 17. Preferably, the first and the second signal-vibration transducers (speaker and receiver) are provided as separate transducers, which will be explained in more detail below.

According to the various embodiments the invention, including this first one, the speaker 16 and the receiver 18 shares the same back-volume 17. Some of the reasons for this is that because of size-constraints this is a preferred solution.

The cellular phone 10 receives signals transmitted from radio base stations by its antenna (not shown). The signals received are transmitted to a radio unit (not shown) comprising or connected to conventional units for modulation/demodulation and sound processing.

To the radio unit, a ringer for providing a ringing tone is typically connected. The ringer can provide a ringing tone by means of the speaker 16, such that the user can be informed of an incoming call.

FIG. 3 is a view illustrating the brief internal composition for implementing the invention.

The speaker 16 is connected to a first amplifier 25 and a first sound signal source 26. The receiver 18 is connected to a second sound signal source 27, which is connected to a second amplifier 31. When the speaker 16 is active, a control/damping unit 33 ensures that the diaphragm (known per se) of the receiver 18 is controlled to a fix position, preferably the position at rest. This will result in a decrease of the acoustic leakage through the receiver 18. When the receiver 18 is active, the control/damping unit 33 is inactive and the signal from the second sound signal source 27 is amplified and played on the receiver 18.

Figure 4:
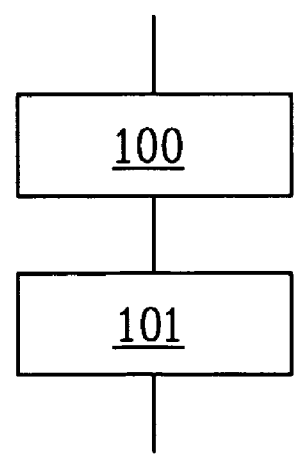
FIG. 4 is a flow chart of the method according to an embodiment of the invention.

Preferably, the control/damping unit 33 is arranged to actively damp the receiver 18 while the speaker 16 is active, step 101 in FIG. 4. Preferably, this is achieved by using a fast simple control algorithm for controlling the current or voltage over the receiver 18 such that movement of the membrane is removed or at least reduced.

Preferably, the control/damping unit 33 comprises a control unit that controls switching between speaker mode and receiver mode. When a user listens to speech from another party, the control unit 33 controls current or voltage over the receiver 18 to avoid the latter to operate as a leak. Preferably, the second sound amplifier 31 of the receiver 18 is damped such that high quality sound reproduction can be realised by the speaker 16 typically wide-range and high volume sound reproduction also including low frequencies without impairing usability of the cellular phone.

Preferably, the control/damping unit is implemented as a software only solution, for instance comprising a processing unit and corresponding memory. Also, already existing software could be upgraded to provide the control/damping unit in the form of a simple control algorithm for controlling the current or voltage over the receiver such that movement of the membrane is removed or at least reduced due to leaking problems.

This is a great advantage with the present invention, since this prevents loss in low frequency range of the speaker and also reduces the risk for loud ringer levels in the receiver output.

It should be realised that cellular phone is just one type of device in which the invention can be implemented. It can just as well be provided in other types of portable electronic devices such as a lap top computer, a palm top computer, an electronic organizer, a smart-phone, a communicator, a calculator or a gaming machine.

There are more ways in which the invention can be varied. Therefore the invention is only to be limited by the accompanying claims.

The invention claimed is:

1. A portable electronic device, comprising:
a speaker connected to a first sound signal source;
a receiver for sound reproduction, where the receiver is connected to a second sound signal source, the speaker and the receiver sharing a back volume space within the portable electronic device; and
a control unit to:
actively damp the receiver while the speaker is active by controlling voltage or current applied to the receiver such that movement of a membrane of the receiver is suppressed to actively reduce acoustic leakage from the receiver when the speaker is active.

2. The device of claim 1, where said control unit controls switching between speaker mode and sound receiver mode.

3. The device of claim 1, where the device includes a cellular phone, a smart phone or a communicator.

4. The device of claim 2, where the device includes a cellular phone, a smart phone or a communicator.

5. A method for sound reproduction for a portable electronic device including a speaker and a receiver for sound reproduction, comprising:
providing sound reproduction via the speaker and the receiver, the speaker and the receiver being connected to different sound signal sources, the receiver and the speaker sharing a back volume, and
actively damping the receiver while the speaker is active, where the actively damping the receiver comprises:
controlling voltage or current applied to the receiver to suppress movement of a membrane of the receiver in order to reduce leakage from the receiver when the speaker is active.

6. The method of claim 5, further comprising:
switching between speaker mode and sound receiver mode to damp the receiver while the speaker is active.

7. The method of claim 5, where the portable electronic device includes a cellular phone, a smart phone or a communicator.

8. The method of claim 5, further comprising:
switching between speaker mode and sound receiver mode to damp the receiver while the speaker is active.

9. A portable electronic device, comprising:
a speaker that is connected to a first sound signal source;
a receiver for sound reproduction, where the receiver is connected to a second sound signal source, the speaker and the receiver sharing a back volume space within the portable electronic device; and
a control unit to:
actively damp the receiver while the speaker is active, where, when actively damping the receiver, the control unit suppresses movement of a membrane of the receiver.

10. The device of claim 9, where the control unit constrains a diaphragm of the receiver to a fixed position to actively damp the receiver.

11. A method for sound reproduction for a portable electronic device including a speaker and a receiver for sound reproduction, comprising:
providing sound reproduction via the speaker and the receiver, the receiver and the speaker sharing a back volume, the receiver and the speaker being connected to separate and distinct sound signal sources, and
actively damping the receiver while the speaker is active, where the actively damping the receiver comprises:
suppressing movement of a membrane of the receiver.

12. The method of claim 11, where the actively damping the receiver comprises:
constraining a diaphragm of the receiver to a fixed position.

13. A device, comprising:
a first speaker, connected to a first sound signal source, to output sound indicating that an incoming communication has been received;
a second speaker, connected to a second sound signal source, to output sound associated with use of the device, the first and second speakers sharing an enclosure within the device; and
a control unit to:
actively damp the second speaker while the first speaker is active, where, when actively damping the second speaker, the control unit controls voltage or current applied to the second speaker to suppress movement of a membrane of the second speaker to actively reduce acoustic leakage from the second speaker.

14. The device of claim 13, where the control unit is further to:
switch between a first mode when an incoming communication is received and a second mode when no incoming communication is being received.

15. The device of claim 14, where, when in the second mode, the control unit does not damp the second speaker.

16. The device of claim 13, where the device includes a cellular phone or a mobile communicator.

17. A device, comprising:
a first speaker, connected to a first sound signal source, to output sound indicating that an incoming communication has been received;
a second speaker, connected to a second sound signal source, to output sound associated with use of the device, the first and second speakers sharing an enclosure within the device; and
a control unit to:
actively damp the second speaker while the first speaker is active, where, when actively damping the second speaker, the control unit controls a current or voltage supplied to the second speaker such that movement of a membrane of the second speaker is suppressed when the first speaker is active.

18. The device of claim 17, where, when actively damping the second speaker, the control unit controls a diaphragm of the second speaker to a fixed position.

* * * * *